Patented Mar. 1, 1949

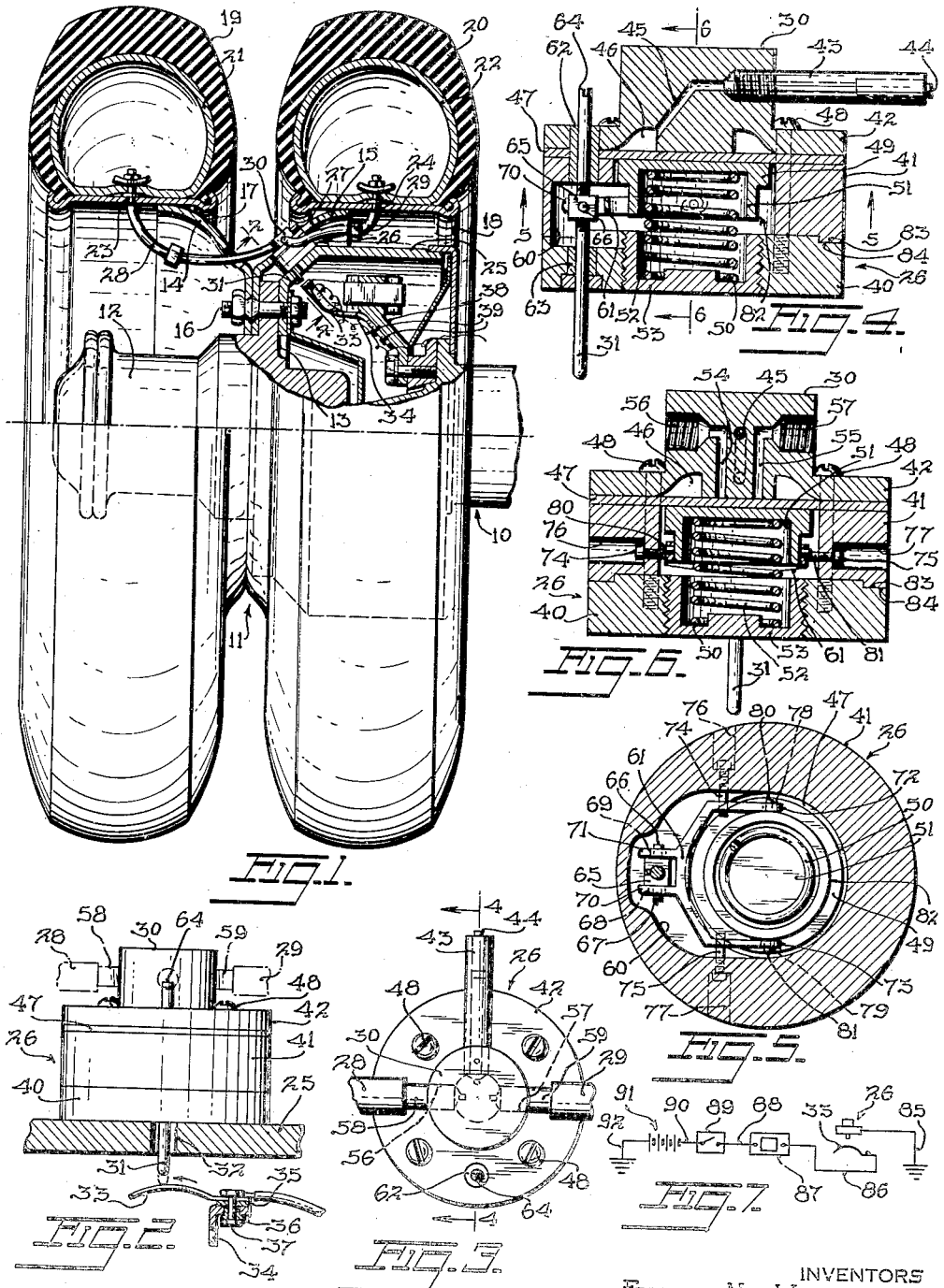

2,463,335

UNITED STATES PATENT OFFICE 2,463,335

PNEUMATIC TIRE ALARM

Frederic M. Warnshuis, Santa Cruz, Calif., and
Raymond T. Lawrence, St. Albans, N. Y.

Application July 24, 1947, Serial No. 763,228

2 Claims. (Cl. 200—58)

The present invention relates to an alarm for indicating when either or both tires on a dual tire wheel of a truck, semi-trailer, trailer, or omnibus have lost predetermined air pressure.

The main object of our invention is to provide a pneumatic tire alarm which operates electrically to indicate by visual or audible signal or both to warn the driver of a truck, semi-trailer, trailer or omnibus when at least one of a pair of dual tires on several wheels of his vehicle is no longer properly inflated.

Another object is to have such an alarm which includes a valve controlled contact member mounted upon the wheel to be safe-guarded, and a stationary corresponding contact member mounted on a stationary portion of the axle housing with which said valve controlled contact member will make effective electrical contact when the predetermined air pressure in one of the dual tires on said wheel is lost and thereby cause a signal to be given in the cab of said vehicle.

A further object is to have such a pneumatic tire alarm which maintains a balance of the necessary air pressure in the two dual tires of each wheel initially from the air introduced at the time the tires are inflated, and thereafter from the inflated tires.

It is also an object to have the mentioned type of tire alarm which is readily applied to each dual tire wheel of a vehicle without having to rebuild the wheels or resort to any complicated procedure or delay occasioned by having to take apart the vehicle for the purpose.

An ancillary object is to provide an alarm of the indicated character which is simple in construction, relatively small and compact, and also certain in operation, not to mention easy to regulate for positive operation, so located as not to interfere with normal tire changes.

Other objects and advantages of our invention, and accruing from its actual application to practical use, will appear more fully in detail as the specification proceeds.

For further comprehension of the invention, and of the objects and advantages thereof, reference will be had to the following description and accompanying drawing, and to the appended claims in which the various novel features of the invention are more particularly set forth.

In the accompanying drawing forming a material part of this disclosure:

Fig. 1 is an elevation of a dual tire truck wheel as seen from the front and shown with portions in fragmentary section to reveal internal structure sufficient to serve the purposes of the invention.

Fig. 2 is an enlarged fragmentary section of Fig. 1 taken on line 2—2.

Fig. 3 is a plan view of the valve device forming the main portion of our invention, as seen from above in Fig. 2.

Fig. 4 is a section of the same device taken on line 4—4 in Fig. 3.

Fig. 5 is also a section taken on line 5—5 of Fig. 4.

Fig. 6 is a further section taken on line 6—6 in said Fig. 4.

Fig. 7 is a circuit diagram.

Throughout the views, the same reference numerals indicate the same or like parts.

In view of the fact that a great deal of the goods transported in commerce is carried in trucks, the latter have been built up to such extent that ordinary single tire wheels are not sufficient for the loads dealt with, but instead dual wheels or wheels with dual tires form the rolling equipment of said trucks.

Of pertinent concern to fleet owners, in particular, and the majority of small operators, is the premature failures of tires in dual set up due to continued or extended operation on improperly inflated tires. In most cases, not only is the under-inflated or "flat" tire ruined but extensive internal damage is accorded to the other tire in the dual set up as a result of its doubly increased burden. Even when both tires of a wheel are in good condition, some roads have such high crowns that the outer tire is hardly loaded while the inner tire which is nearer the crest of the road takes the greater part of the load resulting in increased internal heat and pressure differential.

Recognizing these problems and menaces to longer tire life, vehicle owners and tire maintenance men have sought to encourage preventative maintenance on the part of operators. It has become a practice among operators of both heavy and smaller carriers to make frequent inflation checks of the tires on their rolling equipment. Even such inspections are not foolproof, as a tire may give way shortly after being inspected, and such inspections in themselves introduce delays which slow down schedules.

At the present time, due to great advances of the trucking industry where maximum pay-loads and fast schedules are the order of the day this problem is further emphasized.

In order to avoid serious service interruptions, promote longer and more economical tire life, and to remove the personal responsibility factor on the part of the operator, and with the foregoing objects in view, it is now proposed to apply a special pneumatic tire signalling apparatus to a truck or other heavy vehicle using dual tires, so that it is never necessary for the driver to lose time by stopping for tire inspection nor running on a deflated tire unaware, but instead be informed instantly when a tire begins to lose pressure.

Hence, in the practice of our invention, a truck axle housing, generally indicated at 10 has a rotatable wheel, indicated at 11 supported thereby on a shaft terminating in a hub 12, all in more or less conventional manner too well known to illustrate in detail. Upon the wheel flange 13 is secured the two opposite wheel shells 14, 15 by bolts 16, the rims 17, 18 being welded or brazed to said wheel members 14 and 15. Upon the rims are mounted the dual tires 19, 20 provided with inner tubes 21, 22, the latter having the conventional valve stems and cores 23, 24 projecting through wheel rims 17, 18. The previously mentioned wheel flange 13 carries the brake drum or similar member 25, also retained by bolts 16, and upon said drum is secured a valve casing 26 by screws or any other means known in the art too superfluous to be shown as such, the valve casing extending up through a lightening hole or clearance aperture 27 in wheel member 15.

To both of the tire valve stems 23, 24 are attached, by means of a tire valve air hose coupling containing a core depression pin, the air tubes 28, 29 connected at their other ends to the casing turret 30, as will be further explained. From the lower part of the valve casing is a depending contact pin 31 projecting through a clearance aperture 32 in drum 25 (Fig. 2). Adjacent to the lower end of the contact pin is a stationary contact 33 insulated from the bracket 34 supporting it by a washer 35 and tube or bushing 36 of insulating material such as fibre or plastic, while a bolt 37 retains the contact in position on the bracket. The latter is fixed to the stationary bracket 38 on axle housing 10 by screws 39, so that rotation of the wheel will cause the contact pin 31 to pass over contact 33 once during each revolution, as will also be explained.

Returning to the valve device 26, as best shown in Figs. 2 to 6, the casing proper consists of three superposed members, the base member 40, intermediate ring member 41, and cap member 42 formed above into the previously mentioned turret 30. To the rear of the latter is screwed an inflating valve stem 43 containing a tire valve 44 and adapted to be connected to the air filling hose of a service station (not shown), this valve stem communicating with the interior duct 45 which in turn communicates at its inner end with internal turret chamber 46. The latter overlies a flexible diaphragm 47, made of rubber or resilient plastic of the vinyl series and clamped between cap 42 and ring member 41. The casing members and this diaphragm are secured together by a group of long screws 48, 48 extending down into casing base 40, the diaphragm forming a resilient closure for the turret chamber. Beneath the latter and supporting the intermediate area of the diaphragm is a follower plate 49, the latter serving also as a spring retainer of a coil spring 50 extending up into chamber 51 in the follower plate, the spring resting in the spring well 52 in the lower spring retainer 53. The latter is screwed into casing base 40 and forms the adjusting screw for adjusting the compression of the spring in order to counterbalance the air pressure which normally presses upon the diaphragm.

In addition to the turret chamber 46 normally containing air under pressure which bears upon the diaphragm, a pair of downwardly directed ducts 54, 55 in cap member 42 are spaced apart and terminate upon said diaphragm, these ducts upwardly communicating with the opposite air line ports 56, 57. The latter are preferably tapped for receiving the threaded hose nipples 58, 59 of the air hose lines 28, 29 for leading to the individual tires 19, 20 by way of their valve stems 23, 24.

However, the diaphragm follower plate 49 is adapted to rise and fall in chamber 60 in intermediate casing member 41, according to the pressure exerted by the air above the diaphragm or by the spring beneath. Attached to follower plate 49 is a lever 61 which utilizes the movement of the plate to give required motion to contact pin 31. A pair of non-friction metal bushings 62, 63 are vertically aligned in the upper, intermediate and base casing members to serve as sliding bearings for the contact pin 31 which is of sufficient length to project a distance down from the casing as a whole, but also above the cap member 42 where it terminates in the slotted upper end 64 adapted to be engaged by a screw driver. As this contact pin extends through the interior chamber 60, the portion therein is threaded and has a trunnion block 65 screwed upon the thread with the adjustment secured by a set screw, the block having two opposite trunnions or studs 66, 67 engaging in elongated holes or slots 68, 69 in the two relatively close ends 70, 71 of lever 61. This lever has a pair of widely spaced arms 72, 73 fulcrummed on a pair of partly threaded fulcrum pins 74, 75 screwed into the intermediate or ring casing member 41 with access to said pins being provided by enlarged clearance holes 76, 77 in the outer walls of said ring member. The inner ends of the last mentioned arms are formed with elongated holes or slots 78, 79 through which two opposite studs 80, 81 rigid with the follower plate 49 project and thereby connect the plate through lever 61 with the contact pin. The follower plate has the portion carrying the studs reduced in diameter at 82 to provide the necessary clearance to accommodate the lever arms 72, 73.

In order to ensure the alignment of the contact pin bushings 62, 63 and also the mutual alignment of the upper and lower spring retainers 49, 53 the base casing member 40 has a marginal recess 83 with which the projecting shoulder 84 of ring member 41 accurately engages, it being of lesser importance to provide such aligning means for the cap member 42 and the ring member, as the bushing 62 suffices as far as necessary.

Assuming that the valve device 26 is mounted in position on the wheel as already outlined, and that the stationary contact 33 is likewise in position, the device 26 is obviously grounded to the wheel and the frame of the truck as indicated at 85 in the circuit diagram of Fig. 7, the stationary contact 33 being connected by lead 86 to an annunciator or other signalling device 87 in the driver's cab. The signalling device may be a light, buzzer or horn, and may, if desired include a relay connected to a source of independent current supply, but in the simple form of circuit shown, the device mentioned is connected by a lead 88 to a switch 89 which may be the ignition switch, serving to control the current supply to the apparatus. The switch is in turn connected by a lead 90 to a battery or other source of current 91, and the latter is connected by a lead 92 to the frame of the truck serving as ground.

When the tires are to be inflated, the service station air hose is applied to the end of rear valve stem 43, whereupon the air introduced opens the tire valve 44 and passes into duct 45 and then into the turret chamber 46, pressing down the diaphragm 47 against the pressure of spring 50 to a sufficient extent to create a space above the diaphragm and force air into the upright ducts 54, 55 and through the latter into the hose lines 28, 29 and thence into the tires, building up the recommended tire pressure in the latter, the diaphragm meanwhile remaining depressed, so that any predetermined pressure can be attained.

When the air supply is cut off, the diaphragm still remains depressed in opposition to the pressure of spring 50, the follower 49 being correspondingly lowered beneath the diaphragm in chamber 60, providing for free intercommunication between the two tires. Should one tire ride on the crest of the road and the other lower down along the side, the excess pressure in the first tire will be relieved by immediately flowing over the diaphragm into the other tire. So long as the tires remain intact, the pressure in both will remain uniform. The lower condition of the follower plate of course causes the wide arms of the lever to dip also, and as the lever is fulcrummed between the ends thereof upon pins 74, 75, the other relatively close ends 70, 71 will occupy a raised position, automatically raising block 65 and contact pin 31.

The arrangement is such that, when the tires are fully inflated, the pin is raised well out of contact with stationary contact 33. Should the spring prove too weak, the lower spring retainer 53 is screwed up a little to increase the spring pressure, but if the latter is too great, screwing the retainer or spring adjuster down in reverse direction will reduce the pressure of the spring to that required. Also, when the pressure in the tires is at the proper level, should the contact pin 31 be down too close to stationary contact 33, a screw driver fitted to the upper slotted end 64 of the contact pin and used to rotate said pin will screw the same up in its block 65 until it presents a proper space below its lower end and the stationary contact.

In the outboard face of block 65 is a recessed head set screw which keeps contact pin 31 from rotating and losing its adjustment in relation to stationary contact 33.

When the tires remain inflated during travel of the vehicle, the contact pin in rotating with the wheel constantly remains out of contact with the stationary contact, but if one of the tires loses air, the pressure holding down the diaphragm is no longer sufficient to resist the upward pressure of the spring, and the latter then raises the upper spring retainer 49 and thereby swings the lever upward and the smaller ends downward, bringing the contact pin down into the position indicated in dotted lines in Fig. 2. The result is that as the wheel rotates, the contact pin makes wiping contact with the stationary contact, momentarily closing the circuit, provided the switch is closed. Such a momentary closure of the circuit is sufficient to operate a drop annuciator or any other type of electrical signal device. The raising of the spring retainer 49 simultaneously presses the diaphragm up against the cap member and closes the ducts 54, 55, thus breaking the communication between the tires and retaining the pressure in the one tire still intact. Due to the reduced effective area of the diaphragm when it raises against the cap member, the spring pressure is greatly increased instantaneously, resulting in positive closure on ducts 54 and 55 and effectively retaining pressure in the intact tire.

The signal device may be connected to only one wheel or to all dual tire wheels on the truck, at will, the principle being the same whether one or more dual tire wheels are included in the circuit. The valve casing and its parts, except the diaphragm, may be made of any suitable metal or combination of metals, and the size and location of the same are such as to avoid any difficulties in changing tires or wheels or making other repairs.

While we have illustrated and described the preferred embodiments of our invention, it is to be understood that we do not limit ourselves to the precise constructions herein disclosed and the right is reserved to all changes and modifications coming within the scope of the invention as defined in the appended claims.

Having thus described our invention, what we claim as new, and desire to secure by United States Letters Patent is:

1. In a land vehicle having at least one pair of pneumatic tires mounted on a common wheel, a housing mounted on said wheel for rotation therewith, said housing having a chamber formed therein, a flexible diaphragm extending across said chamber intermediate the end thereof and secured to said housing, said housing having a portion thereof projecting inwardly into said chamber and terminating adjacent said diaphragm on one side thereof, said housing having a recess formed therein surrounding said portion, said portion having a pair of passageways formed therein, each of said passageways having an inner port adjacent said diaphragm and an interior port, conduit means connecting with the interior of each of said tires and said exterior ports, whereby air under pressure enters said passageway forcing said diaphragm away from said inner ports and filling said recess, and resilient means positioned within said chamber on the other side of said diaphragm, said resilient means engaging against and constantly urging said diaphragm toward said inner ports whereby a decrease in air pressure in either of said tires enables said resilient means to force said diaphragm into engagement with ports.

2. In a land vehicle having at least one pair of pneumatic tires mounted on a common wheel and a pressure responsive, switch actuated electrical signal circuit; that improvement which comprises mounting a housing on said wheel for rotation therewith, said housing having a chamber formed therein, a flexible diaphragm extending across said chamber and secured to said housing, said housing having a portion thereof projecting inwardly into said chamber and terminating adjacent said diaphragm on one side thereof, said housing having a recess formed therein surrounding said portion, said portion having a pair of passageways formed therein, each of said passageways having an inner port adjacent said diaphragm and an exterior port, conduit means connecting the interior of each of said tires with said exterior ports whereby air under pressure enters said passageways forcing said diaphragm away from said inner ports and filling said recess, resilient means positioned within said chamber on the other side of said diaphragm, said resilient means comprising a diaphragm follower having a surface engaging said diaphragm, a coil spring, said spring having one of its ends engaging said follower and the other end thereof engaging said housing, whereby a decrease in pressure in either of said tires enables said resilient means to force said diaphragm into engagement with said ports, a link having one of its ends pivotally connected with said follower, a fulcrum for said link, said fulcrum being secured to said housing, a rod fixedly mounted on the other end of said link, said rod being mounted for reciprocation in said housing and having a portion extending exteriorly thereof, said rod when moved outwardly of said housing closing said switch and energizing said electric signal circuit.

FREDERIC M. WARNSHUIS.
RAYMOND T. LAWRENCE.

REFERENCES CITED

The following references are of record in the file of this patent:

UNITED STATES PATENTS

| Number | Name | Date |
|---|---|---|
| 1,616,032 | Duffy | Feb. 1, 1927 |
| 2,056,064 | Fenton | Sept. 29, 1936 |
| 2,308,372 | Krantz | Jan. 12, 1943 |
| 2,316,461 | Schubert | Apr. 13, 1943 |